US005568526A

United States Patent [19]
Ferraiolo et al.

[11] Patent Number: 5,568,526
[45] Date of Patent: Oct. 22, 1996

[54] SELF TIMED INTERFACE

[75] Inventors: Frank D. Ferraiolo, New Windsor; Robert S. Capowski, Verbank; Daniel F. Casper, Poughkeepsie; Richard C. Jordan, Lake Katrine, all of N.Y.; William C. Laviola, Round Rock, Tex.

[73] Assignee: International Business Machines Corporation, Armonk, N.Y.

[21] Appl. No.: 452,445

[22] Filed: May 26, 1995

Related U.S. Application Data

[62] Division of Ser. No. 261,515, Jun. 17, 1994.

[51] Int. Cl.$^6$ .................................................. H04B 1/10
[52] U.S. Cl. .............................. 375/356; 375/371; 371/1; 327/163
[58] Field of Search .................................. 375/106, 110, 375/111, 118, 354, 359, 360, 371, 372; 371/1; 370/100.1, 105.3, 105.5; 455/276.1; 328/72, 162, 163, 155

[56] References Cited

U.S. PATENT DOCUMENTS

| | | | |
|---|---|---|---|
| 4,694,472 | 9/1987 | Torok et al. | 375/355 |
| 4,873,703 | 10/1989 | Crandall et al. | 375/354 |
| 4,916,717 | 4/1990 | Sackman, III et al. | 375/355 |
| 4,977,582 | 12/1990 | Nichols | 375/371 |
| 5,268,932 | 12/1993 | Okazono | 375/354 |
| 5,313,501 | 5/1994 | Thacker | 375/371 |

FOREIGN PATENT DOCUMENTS

0579389A1  6/1993  European Pat. Off. .

OTHER PUBLICATIONS

Jacobs, G M, "A Fully Asynchronous Digital Signal Processor Using Self-timing Circuits," IEEE Journal of Solid-State Circuits, vol. 25 No. 6 Dec. 1990 pp. 1526–1531.

*Primary Examiner*—Young T. Tse
*Assistant Examiner*—Bryan E. Webster
*Attorney, Agent, or Firm*—Lynn L. Augspurger; Laurence J. Marhoefer

[57] ABSTRACT

A self-timed interface (STI) in which a clock signal clocks bit serial data onto a parallel, electrically conductive bus and the clock signal is transmitted on a separate line of the bus. The received data on each line of the bus is individually phase aligned with the clock signal. The received clock signal is used to define boundary edges of a data bit cell individually for each line and the data on each line of the bus is individually phase adjusted so that, for example, a data transition position is in the center of the cell.

5 Claims, 5 Drawing Sheets

SELF TIMED INTERFACE

This is a division of copending application Ser. No. 08/261,515, filed Jun. 17, 1994.

BACKGROUND OF THE INVENTION

1. Field of the Invention

This invention relates to an improved method and apparatus for transmitting digital data at high speeds via a parallel data bus, and more particularly, to a method and apparatus that provides a cost effective short-haul interface for a wide variety of data transfer applications while eliminating precise bus length and system clock rates as a critical or limiting factor in system design.

2. Cross Reference to Related Applications

The present United States patent application is related to the following co-pending United States patent applications incorporated herein by reference:

Application Ser. No. 08/262,087, filed Jun. 17, 1994, now U.S. Pat. No. 5,487,095, entitled "Digital Phase Locked Loop with Improved Edge Detector," and assigned to the assignee of this application.

Application Ser. No. 08/261,522, filed Jun. 17, 1994, entitled "Multiple Processor Link," and assigned to the assignee of this application.

Application Ser. No. 08/261,561, filed Jun. 17, 1994, entitled "Enhanced Input-Output Element," and assigned to the assignee of this application.

Application Ser. No. 08/261,603, filed Jun. 17, 1994, entitled "Massively Parallel System," and assigned to the assignee of this application.

Application Ser. No. 08/261,523, filed Jun. 17, 1994, entitled "Attached Storage Media Link," and assigned to the assignee of this application.

Application Ser. No. 08/261,641, filed Jun. 17, 1994, entitled "Shared Channel Subsystem," and assigned to the assignee of this application.

DESCRIPTION OF THE PRIOR ART

As will be appreciated by those skilled in the art, such factors as noise and loading limit the useful length of parallel busses operating at high data rates. In the prior art, the length of the bus must be taken into account in the system design and the bus length must be precisely as specified. Manufacturing tolerances associated with physical communication link (chips, cables, card wiring, connectors, etc.) and temperature and variations in power supply voltage also limit the data rates on prior art busses comprised of parallel conductors. Further, many prior art computer systems transfer data synchronously with respect to a processor clock, so that a change in processor clock rate may require a redesign of the data transfer bus.

SUMMARY OF THE INVENTION

An object of this invention is the provision of a cost effective bus data transfer system that can operate at high data transfer rates without tight control of the bus length, and without system clock constraints; a system in which the maximum bus length is limited only by the attenuation loss in the bus.

Another object of the invention is the provision of a general purpose, low cost, high performance, point to point data communication link where the width and speed of the interface can easily be modified to tailor it to specific bandwidth requirements and to specific implementation technologies, including VLSI technologies.

A further object of the invention is the provision of a bus data transfer system that operates a clock speed equal to the data rate or less than the data rate.

A more specific object of the invention is the provision of a system that adjusts the phase or arrival time of the incoming data on the receive side so it can be optimally sampled by the local receive clock, compensating for many of the manufacturing tolerances associated with the physical link (chip, cable, card wiring, connectors, etc.) as well as temperature changes and power supply output variations.

Briefly, this invention contemplates the provision of a self-timed interface (STI) in which a clock signal clocks bit serial data onto a parallel, electrically conductive bus and the clock signal is transmitted on a separate line of the bus. The received data on each line of the bus is individually phase aligned with the clock signal. The received clock signal is used to define boundary edges of a data bit cell individually for each line and the data on each line of the bus is individually phase adjusted so that, for example, a clock transition position is in the center of the data cell. The data is written into a buffer using the received link clock and then read out synchronously with the receiver system clock. At the data rates contemplated in the application of this invention, the propagation delay is significant. However, within limits, the bus length is not critical and is independent of the transmit and received system clock.

In one specified embodiment of the invention, data to be transmitted is transferred to a buffer synchronously with the transmitter system clock, which may or may not be the receiver system clock. A controller formats the data into packets for byte parallel, bit serial, transmission along with headers specifically coded to provide unique data patterns that allow for correction of skew of up to three bit cells in addition to the initial phase adjustment.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
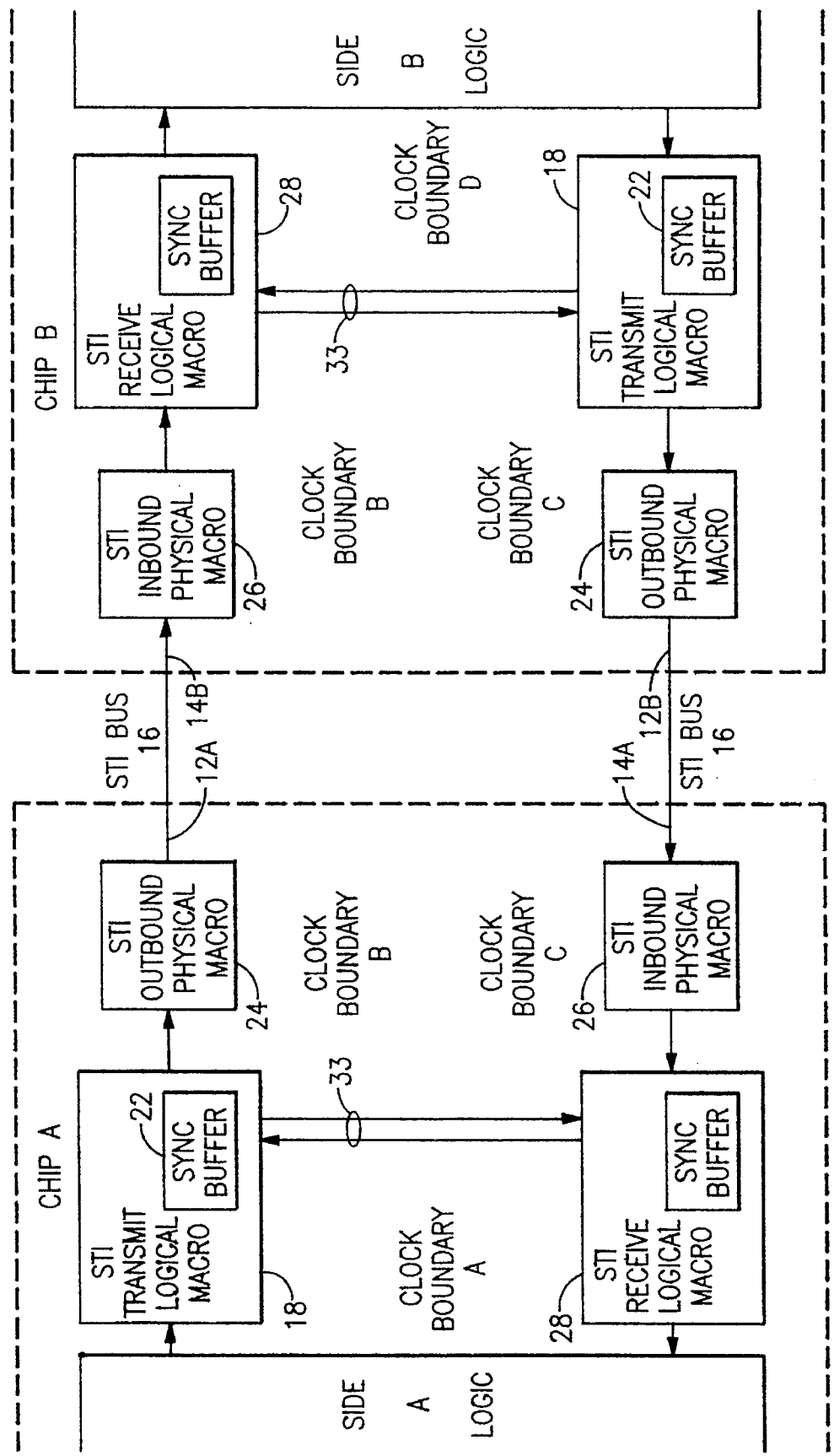
FIG. 1 is an overview block diagram illustrating the application of a self-timed interface, in accordance with the teachings of this invention, to data communication among computer chips.

Referring now to FIG. 1 of the drawings, it illustrates one embodiment in which a self-timed interface in accordance with the teachings of this invention can be used. This exemplary embodiment of the self-timed interface provides data communications between two microprocessor chips, labeled here as Chip A and Chip B. However, as will be apparent to those skilled in the art, the self-timed interface of this invention is applicable to provide data transfer between a wide variety of components or nodes.

Chip A has a transmit port labeled 12A and Chip B has a transmit port labeled 12B. Similarly, Chips A and B have receive ports labeled 14A and 14B, respectively. The ports are connected by two self-timed interface busses 16; one for each transmission direction. In this exemplary embodiment of the invention, each bus 16 is one byte wide, and comprised of nine electrical conductors; eight conductors for data and one conductor for a clock signal.

Each transmit port (12A and 12B) includes a transmit logical macro 18 that provides a logical interface between the host logic and the self-timed interface link 16. Sync buffers 22 provide an interface between the host clock and the self-timed interface clock. This allows the self-timed interface link to run at a predetermined cycle time that is independent of the host clock, making the self-timed interface link independent of the host. An outbound physical macro 24 serializes a word-wide data flow into a byte-wide data flow that is transmitted along with the clock on the self-timed interface link 16.

Each receive port (i.e., 14A and 14B) includes an inbound physical macro 26 that first dynamically aligns each data bit with the self-timed interface clock signal. It aligns any bits with skew up to three bit cells and deserializies the bytes into words. A receive logical macro 28 provides an interface between the self-timed interface receiver logic and the host logic and generates link acknowledge signals and link reject signals, which are coupled by internal links 33 and transmitted back to the transmitting port via an outbound self-timed interface link 16. In order to compensate for variations in electrical path delay, the phase of the incoming data is adjusted, or self-timed. Each bit (line) is individually phase aligned to the transmitted reference clock and further aligned to compensate, within embodiment, for up to three bit cells of skew between any two data lines. The self-timing operation has three parts. The first is to acquire bit synchronization; the second is byte/word alignment; and the third is maintaining synchronization.

In acquiring bit synchronization, the link takes itself from a completely untimed state into synchronous operation. Any previous condition on the STI interface or logic is disregarded with a complete logic reset. The bit synchronization process can be rapidly established, for example on the order of 200 microseconds. The phase of the incoming data is manipulated on a per line basis until the data valid window or bit interval is located. This is accomplished using a phase detector that locates an average edge position on the incoming data relative to the local clock. Using two phase detectors one can locate two consecutive edges on data and these two consecutive edges define the bit interval or data valid window. The data to be sampled by the local clock is the phase of the data located halfway between the two edges of the data.

Figure 4:
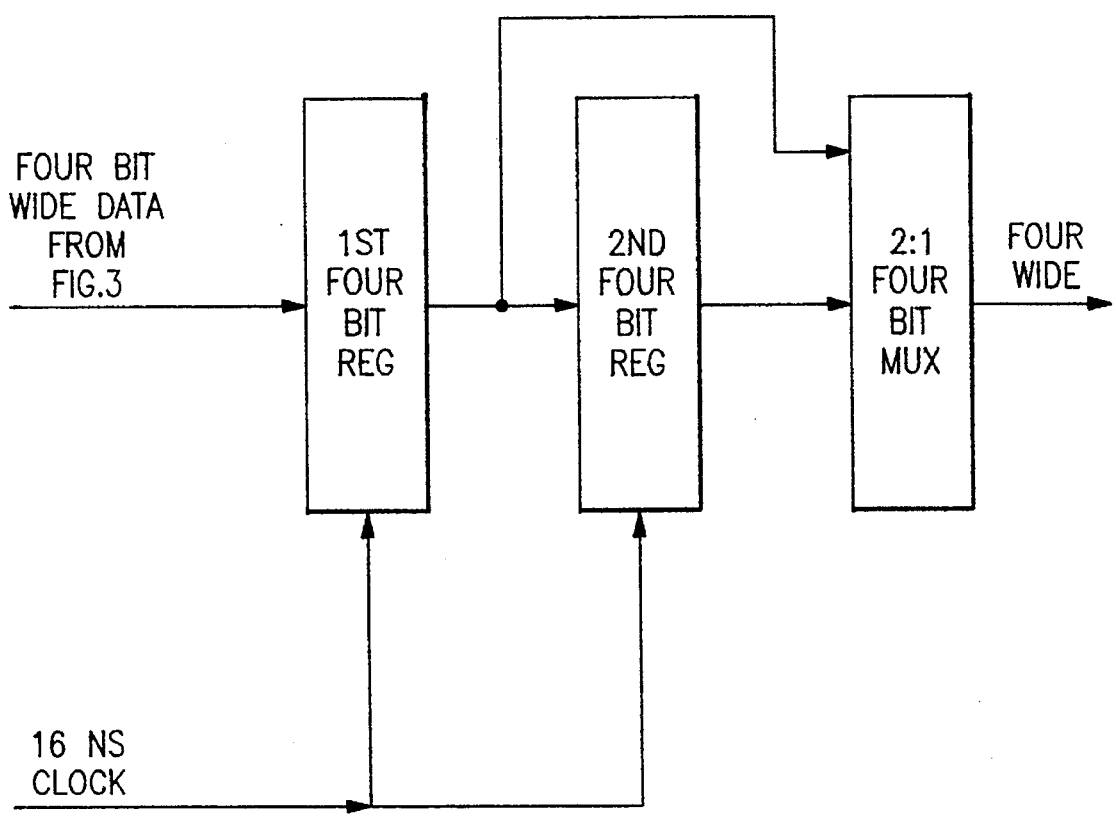
FIG. 4 is a block diagram illustrating the next step in the byte synchronization process.

Byte alignment takes place by manipulating the serial data stream in whole bit times to properly adjust the byte position relative to a deserializer output. Referring now to FIG. 4, word alignment takes place next by manipulating the deserializer data four bit intervals at a time to ensure proper word synchronization on the STI interface. A timing sequence allows proper bit, byte and word synchronization.

Synchronization maintenance occurs as part of the link operation in response to temperature and power supply variations.

Figure 2:
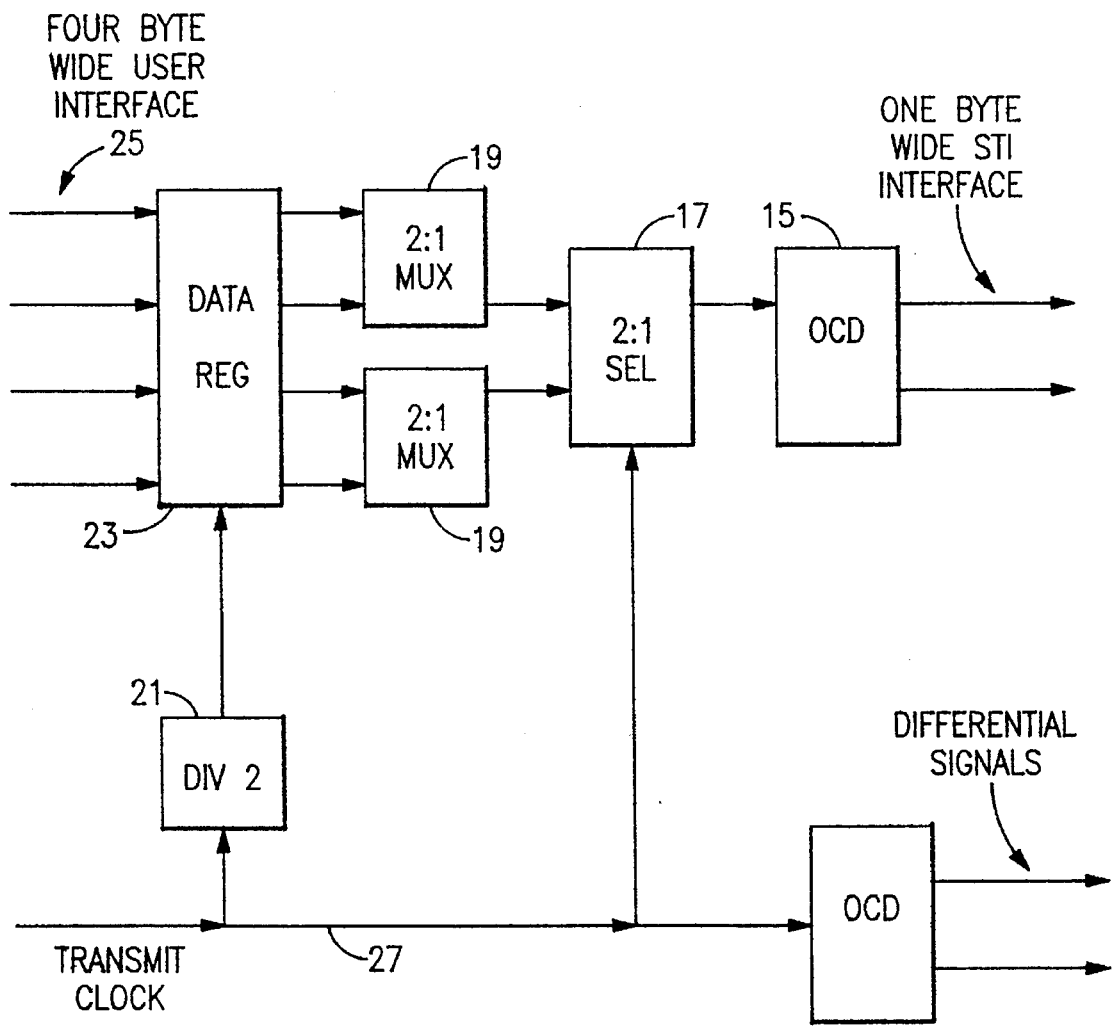
FIG. 2 is a block diagram illustrating one embodiment of a transmitter serializer for implementing a self-timed interface in accordance with this invention.

Referring now to FIG. 2, which illustrates one embodiment of a transmit serializer for a bit serial byte parallel interface used in the practice of the invention. Here a four byte wide data register 23 receives parallel inputs 25 (bytes 0, 1, 2 and 3 inputs shown here) and multiplexers 19 and 2:1 selector 27 multiplex the register output to a one byte wide output of off chip driver 15 coupled to a self-timed interface bus. Data is clocked from the register 23 by divide-by-two logic 12 whose input is self-timed interface clock signal on line 27. Bit zero from bytes 0, 1, 2 and 3 are serialized and transmitted on link 0 of the self-timed interface, shown here. Bit 1 from bytes 0, 1, 2 and 3 will be transmitted on link 1 (not shown) and so on.

To minimize the bandwidth requirements of the communication media the STI clock is one half the frequency of the transmitted data (baud) rate, i.e., a 75 Mhz clock will be used for a 150 Mbit/S data rate. The clock will be generated from an STI oscillator source, this is done to decouple the system or host clock from the STI link. The data will be transmitted with both edges of the clock.

Figure 3:
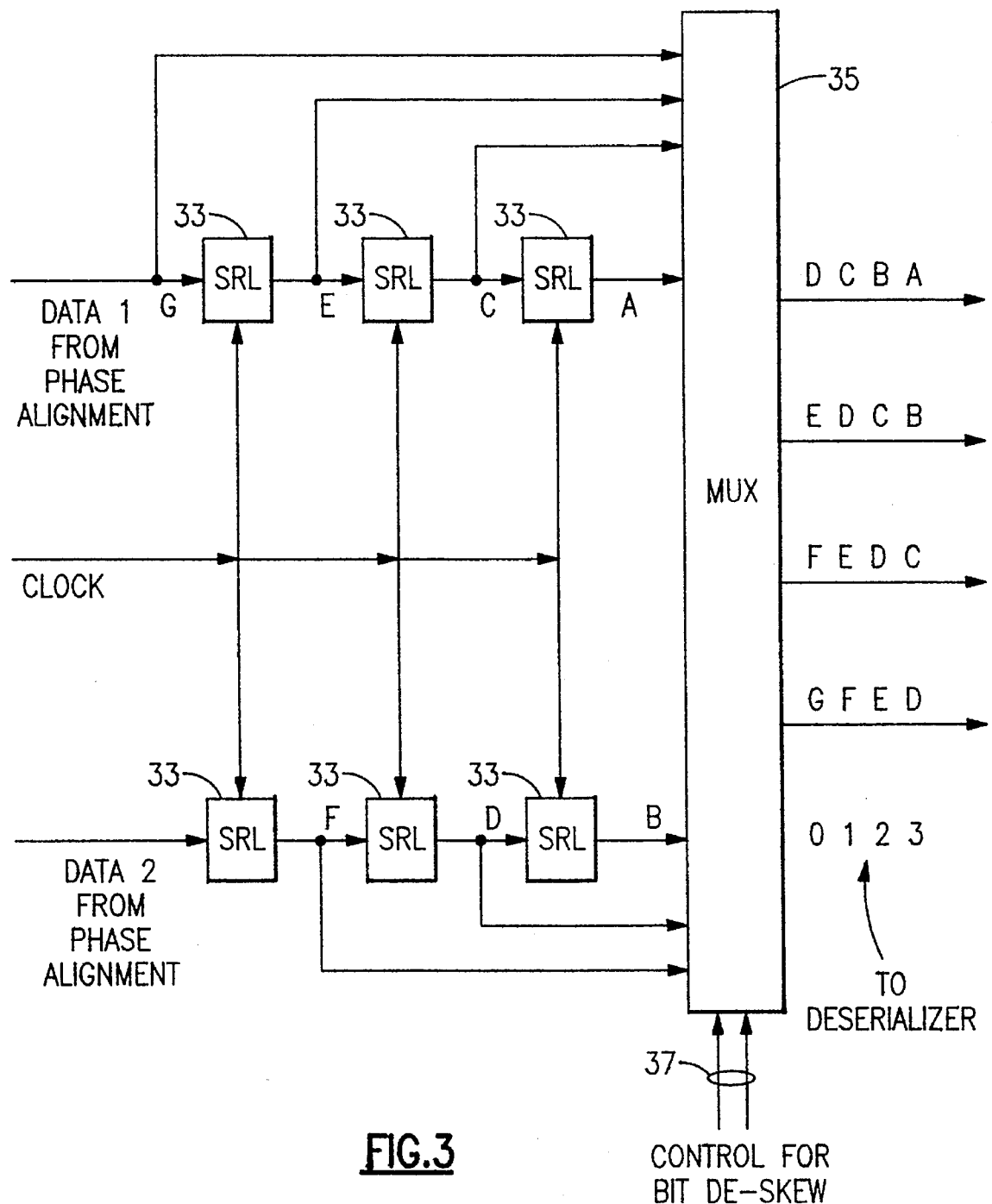
FIG. 3 is a block diagram illustrating byte synchronization in accordance with the invention.

Referring now to FIG. 3, assuming a bit synchronization process as described in connection with 5 has been completed, byte synchronization starts by coupling the phase aligned data (now 2 bits wide) into shift registers 33 whose outputs are coupled to multiplexer 35. Control inputs 37 to the multiplexer are used to deskew the particular data line from the other data lines by whole bit times. The deserializer data output for a particular data line is monitored for an expected timing pattern (e.g., X 0 1 0 where X is a don't care) to determine the proper order of the received data. If at any time a zero is detected in the bit 3 position, the multiplexer is incremented thus moving the byte boundary by one bit time. This process is repeated until the proper byte boundary is located. The multiplexer control wraps around from a binary 3 to a binary 0 in case the correct position was incorrectly passed through the previous time. This function allows synchronization of data lines skewed by more than an entire bit time.

Finally word alignment takes place. Referring now to FIG. 4, word alignment is established by manipulating the deserializer output bus four bits at a time until word synchronization is established. Note that the first register is shifted by four bit times relative to the second register. Four bit times is the maximum any data bit can be skewed relative to another data bit (3 bit times on link+1 bit time from phase alignment section).

As will be appreciated by those skilled in the art, any of a number of circuits, such as a digital phase lock loop, can be used as the self-timer 52 to provide individual phase synchronization between the clock and the data. However, in a preferred embodiment of the invention, the novel edge detector disclosed in U.S. Pat. No. 5,487,095, and assigned to the assignee of this application, and incorporated herein by reference.

Figure 5:
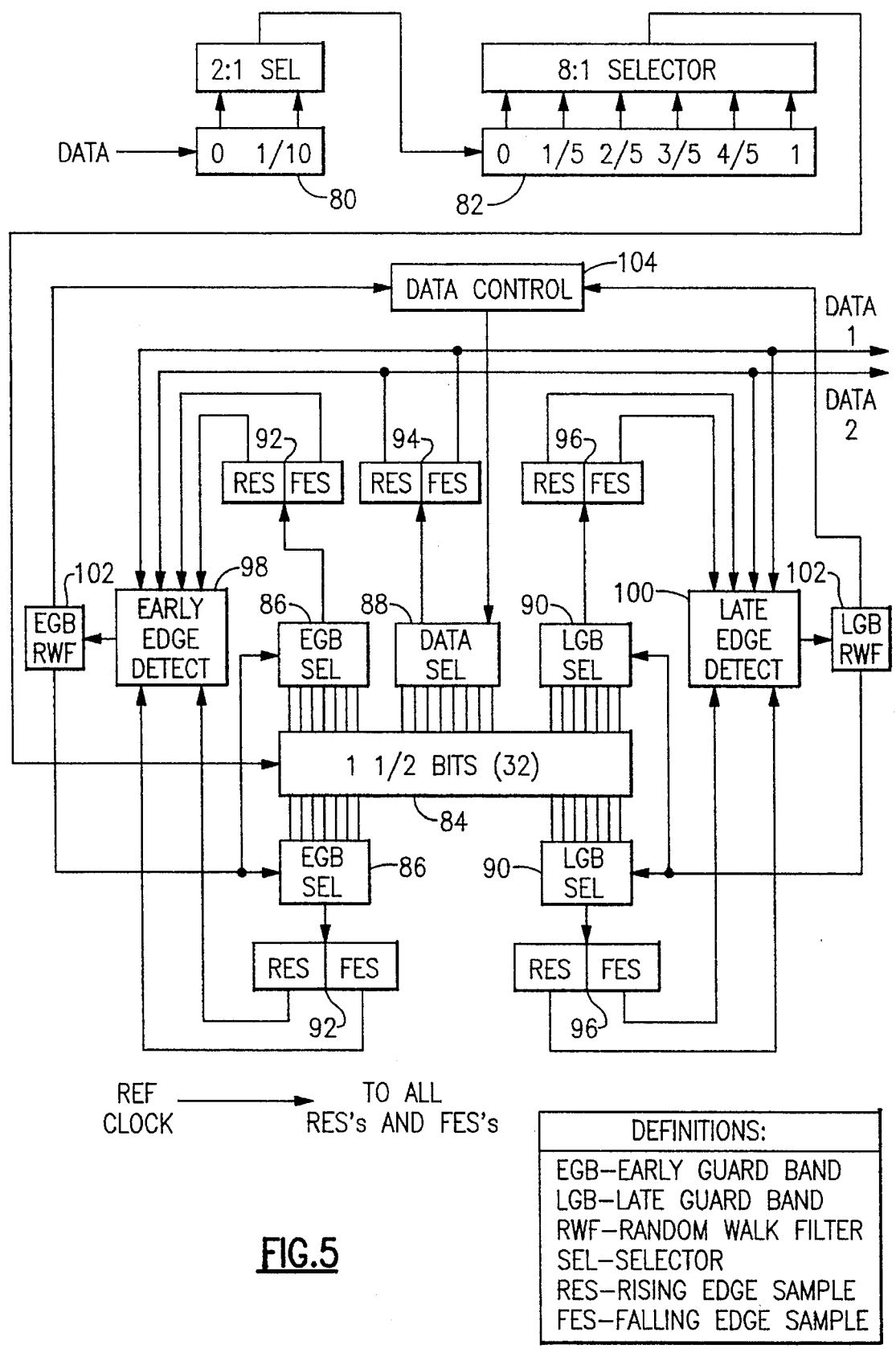
FIG. 5 illustrates phase alignment and sampling logic in accordance with a preferred embodiment of the invention.

Referring now to FIG. 5, in this embodiment of the invention, the clock rate is the same as the data rate. The data edges that define a data window are each detected independently of the other and the data is sampled at the midpoint between the edges when the edges have been aligned with the clock. The position of the edges of incrementally separated phases of the input data stream are successively compared to the position of the rising and falling edges of the clock in order to locate the edges of the data stream with respect to both edges of the clock (e.g., the rising and falling edges).

The data phase pairs are generated in this specific embodiment of the invention by three incrementally selectable delay elements 80, 82, and 84. For example, the elements 80 and 82 provide delays, respectively, in 1/10th and 1/5th bit time increments and element 84 provides fine increments on the order of 1/20th of a bit time. The fine delay element 84 is separated into three groups to provide early edge detection, system data detection, and late edge detection. An early guard band selector 86 successively selects one phase of the data stream to provide an "early" phase of the incrementally separated phases—one for the rising edge and one for the falling edge. Similarly, a late guard band selector 90 successively selects one phase of the data stream to provide a "late" phase of the incremental phases—again one for the rising edge and one for the falling edge. A selector 88 selects incremental phases for the mid-cell system data position.

A selected data phase is coupled as an input to master-slave RES-FES latch pairs 92, 94, and 96. The rising edge data samples are clocked into the RES latches and the falling edge data samples are clocked into the FES latches. The outputs of the RES-FES latch pair 92 are connected to an early edge detector 98. Similarly, the outputs of the RES-FES latch pair 96 are coupled to a late edge detector 100. The RES latch of pair 94 is coupled to the early edge detector 98 and the FES latch of pair 94 is coupled to the late edge detector 100.

Each edge detector (98 and 100) outputs a "lead", a "lag" or a "do nothing" output which indicates the location of a data edge with respect to the reference clock edge location. The output of each edge detector is coupled via a suitable filter 102 (i.e., a random walk filter), back to its respective selector 86 and selector 90, respectively. The selectors shift the phase of the data coupled to the RES-FES latches in the direction indicated,1 or if "do nothing" is indicated, the phase of the data at that edge is not shifted.

Data control logic 104 controls the system data output by selecting the phase of the data that is halfway between the two data edges when the data edges are aligned with the reference clock. A phase of the data (Data 1 and Data 2) is outputted at each reference clock edge.

In operation of a specific embodiment, at power on the logic will automatically begin the bit synchronization process. A 16 microsecond timer is started, the bulk delays are reset to their minimum delay and a 16 bit Counter running off the divided down clock is started. The edge detect circuitry will sample the incoming data with the received reference clock. The edge detector will output a "lead", a "lag" or a "do nothing" signal that indicates the data edge location relative to the reference clock. This signal is filtered by a Random Walk Filter (RWF) and fed-back to the selectors of their respective RES and FES circuits. The selectors shift the phase of the data into the RES and FES as indicated by the edge detector. Each edge detector Operates independently of the other. Each will locate the transitions on data relative to the received (ref) clock by manipulating the incoming phase of the data to the edge detector as described above. The phase of the system data is controlled by the data control logic which selects the phase of the data halfway between the two edge detectors. In parallel with the bit synchronization process, the order of bits out of the deserializer are manipulated to the correct order (see byte/word synchronization below). When the 16 microsecond timer trips the algorithm resets a deserializer error latch and restarts the 16 microsecond counter. The deserializer output is compared against the expected timing pattern (X 0 1 0 where X is a don't care). A single miscompare on any cycle during,the next 16 microseconds will set the deserializer error latch. When the 16 microsecond counter trips again the algorithm checks the addresses of the EGB, LGB, and data selectors, deserializer error latch. In order for a bit to end the initial bit synchronization search state, the deserializer output latch must have remained reset AND the all selectors must be properly centered in their tracking range (centering ensures that adjustments can be made to allow for the tracking of temp. and power supply variations after the initial bit synchronization process). If both conditions are not met then the algorithm adds a bulk delay element, resets the 16 microsecond counter and the search process begins once again. Each and every bit (data line) on the STI interface undergoes this process in parallel. Once an individual data line is determined to meet the initial bit synchronization criteria described above it is degated while the other lines continue to be adjusted. The bit synchronization process is complete once all bits are adjusted and meet the search criteria. The logic will not exit the bit synchronization mode until the 16 bit counter trips.

During normal operation the physical macro will continuously monitor the incoming data to ensure that the optimum clock sampling relationship exists. Small updates will be made to track temperature, power supply and data jitter. These updates will be seamless and transparent to the host logic. Approximately ½ a bit time of delay will be needed to compensate for temperature and power supply variations to maintain proper synchronization. This added delay is in the fine delay elements section. There is also circuitry to monitor the position of the guard bands relative to the allowable range of operation. If a guard band reaches the end of its range, two cases exists: 1) a new bulk delay element is added and the fine delay elements are adjusted accordingly. Note this can cause sampling errors in the data. The circuitry that makes these on the fly bulk adjustments can be inhibited so no on the fly bulk delay adjustments are made during normal operation. The second case exists when one of the guard bands reaches the end of its range and the on the fly bulk delay adjustment is inhibited, the physical macro will signal the logical STI macro that a bit synchronization is required soon. The link should finish the immediate work and force the link into timing mode.

While the invention has been described in terms of a single preferred embodiment, those skilled in the art will recognize that the invention can be practiced with modification within the spirit and scope of the appended claims. For example, while the invention has been illustrated with the data stream delayed relative to the clock, the same results can be obtained by generating multiple phases of the clock relative to the data stream.

Having thus described our invention, what we claim as new and desire to secure by Letters Patent is as follows:

1. A self-timed communications interface for transmitting digital data between a first node and a second node over a plurality of parallel digital data lines and a clock signal line, comprising in combination:

said first node including;
  a digital data buffer;
  means for generating a communications clock signal;
  means responsive to said communications clock signal for coupling parallel digital data from said digital data buffer simultaneously to said plurality of parallel digital data lines synchronously with said communications clock signal; and
  means to couple said communications clock signal to said clock signal line;

said second node including;
  means for receiving said digital data signal coupled to said plurality of parallel digital data lines;
  means for receiving said communications clock signal coupled to said communications clock signal line;

comparing means coupled to said means for receiving said digital data signal and said means for receiving said communications clock signal;

said comparing means comparing a phase of said communications clock signal with a phase of said digital data signal coupled respectively to each of said plurality of parallel digital data lines, and means coupled to said comparing means to independently adjust the phase of said digital data signal coupled respectively to each of said plurality of parallel digital data lines relative to said communications clock signal in order to individually phase align said digital data signal coupled to each of said plurality of data lines and said communications clock signal received by said means for receiving said communications clock signal.

2. A self-timed communications interface as in claim 1 wherein said comparing means includes means for aligning an edge of said communications clock signal with one edge of said digital data signal.

3. A self-timed communications interface as in claim 1 wherein said comparing means includes means for aligning both edges of said communications clock signal with said digital data signal.

4. A self-timed communications interface as in claim 1 wherein said digital data coupled simultaneously to said plurality of data lines is bit serial data on each line and byte parallel data across said plurality of parallel digital data lines, and further includes means for correcting byte parallel data skew in data bits across said lines after the bits have been phase aligned with said clock signal.

5. A self-timed communications interface as in claim 4 where said means for correcting skew corrects skew up to three bit positions.

* * * * *